United States Patent
Petrone et al.

(10) Patent No.: US 10,894,251 B2
(45) Date of Patent: Jan. 19, 2021

(54) CATALYTIC COATINGS, METHODS OF MAKING AND USE THEREOF

(71) Applicant: BASF QTECH INC., Mississauga (CA)

(72) Inventors: Sabino Steven Anthony Petrone, Edmonton (CA); Robert Leslie Deuis, Edmonton (CA); David John Waldbillig, Edmonton (CA); Daniel Pilon, Edmonton (CA); Fuwing Kong, Edmonton (CA); Shoma Sinha, Edmonton (CA)

(73) Assignee: BASF QTech Inc., Mississauga (CA)

( * ) Notice: Subject to any disclaimer, the term of this patent is extended or adjusted under 35 U.S.C. 154(b) by 172 days.

(21) Appl. No.: 16/321,087

(22) PCT Filed: Jul. 27, 2017

(86) PCT No.: PCT/IB2017/054583
§ 371 (c)(1),
(2) Date: Jan. 28, 2019

(87) PCT Pub. No.: WO2018/020464
PCT Pub. Date: Feb. 1, 2018

(65) Prior Publication Data
US 2019/0176138 A1    Jun. 13, 2019

Related U.S. Application Data

(60) Provisional application No. 62/368,279, filed on Jul. 29, 2016.

(51) Int. Cl.
*B01J 35/00*      (2006.01)
*B01J 23/30*      (2006.01)
(Continued)

(52) U.S. Cl.
CPC ......... *B01J 35/0006* (2013.01); *B01J 23/005* (2013.01); *B01J 23/10* (2013.01);
(Continued)

(58) Field of Classification Search
CPC ...... B01J 23/005; B01J 35/0006; B01J 23/10; B01J 23/30; B01J 23/34; B01J 23/888;
(Continued)

(56) References Cited

U.S. PATENT DOCUMENTS 3,082,084 A  *  3/1963  Alexander ............ C22C 1/1026
                                                      419/20
4,289,661 A      9/1981  Vinals et al.
(Continued)

FOREIGN PATENT DOCUMENTS

CA      2227396     2/1998
CA      2357407    12/2001
(Continued)

OTHER PUBLICATIONS

Bell et al. Tritium permeation through clean incoloy 800 and sanicro 31 alloys and through steam oxidized incoloy 800. Metallurgical and Materials Transactions A, 1980, 11(5), 775-782.
(Continued)

*Primary Examiner* — Patricia L. Hailey
(74) *Attorney, Agent, or Firm* — DLA Piper LLP (US)

(57) ABSTRACT

Described herein are coatings. The coatings can, for example, catalyze carbon gasification. In some examples, the coatings comprise: a first region having a first thickness, the first region comprising manganese oxide, a chromium-manganese oxide, or a combination thereof, and $CaWO_4$, $Ba_3Y_2WO_9$, or a combination thereof; a second region having a second thickness, the second region comprising $X_6W_6Z$, XWZ, or a combination thereof, wherein X is independently Ni or a mixture of Ni and one or more
(Continued)

transition metals and Z is independently Si, C, or a combination thereof. In some examples, the coatings further comprise a rare earth element, a rare earth oxide, or a combination thereof.

20 Claims, 7 Drawing Sheets

(51) Int. Cl.
| | |
|---|---|
| B01J 23/34 | (2006.01) |
| B01J 37/02 | (2006.01) |
| B01J 23/888 | (2006.01) |
| C23C 24/08 | (2006.01) |
| C23C 30/00 | (2006.01) |
| B01J 23/00 | (2006.01) |
| B01J 23/10 | (2006.01) |
| B01J 23/889 | (2006.01) |
| B01J 27/22 | (2006.01) |
| B01J 35/02 | (2006.01) |
| C01B 3/02 | (2006.01) |
| C10G 75/04 | (2006.01) |

(52) U.S. Cl.
CPC ............. *B01J 23/30* (2013.01); *B01J 23/34* (2013.01); *B01J 23/888* (2013.01); *B01J 23/8892* (2013.01); *B01J 23/8898* (2013.01); *B01J 27/22* (2013.01); *B01J 35/02* (2013.01); *B01J 37/0215* (2013.01); *B01J 37/0225* (2013.01); *B01J 37/0228* (2013.01); *B01J 37/0244* (2013.01); *C01B 3/02* (2013.01); *C10G 75/04* (2013.01); *C23C 24/082* (2013.01); *C23C 30/00* (2013.01); *C10G 2300/4075* (2013.01)

(58) Field of Classification Search
CPC .... B01J 23/8892; B01J 23/8898; B01J 27/22; B01J 35/02; B01J 37/0215; B01J 37/0225; B01J 37/0228; B01J 37/0244; C01B 3/02; C10G 75/04; C10G 2300/4075; C23C 24/082; C23C 30/00
USPC ............... 502/177, 178, 185, 241, 258, 524; 428/615, 655, 656; 419/19, 20, 35; 75/236; 420/441, 578
See application file for complete search history.

(56) References Cited

U.S. PATENT DOCUMENTS

| | | | |
|---|---|---|---|
| 4,297,150 A | | 10/1981 | Foster et al. |
| 4,298,661 A | | 11/1981 | Ikeno et al. |
| 4,404,487 A | | 9/1983 | Nimura |
| 4,613,372 A | | 9/1986 | Porter |
| 4,804,487 A | | 2/1989 | Reed et al. |
| 4,863,892 A | | 9/1989 | Porter et al. |
| 5,015,358 A | | 5/1991 | Reed et al. |
| 5,138,111 A | * | 8/1992 | Kugler .................... B01J 27/22 |
| | | | 518/714 |
| 5,242,665 A | | 9/1993 | Maeda et al. |
| 5,446,229 A | | 8/1995 | Taylor et al. |
| 5,565,087 A | | 10/1996 | Brown et al. |
| 5,616,236 A | | 4/1997 | Brown et al. |
| 5,630,887 A | | 5/1997 | Benum et al. |
| 5,677,261 A | | 10/1997 | Tenten et al. |
| 5,873,951 A | | 2/1999 | Wynns et al. |
| 5,910,608 A | | 6/1999 | Tenten et al. |
| 5,918,103 A | * | 6/1999 | Kobayashi .............. C22C 1/055 |
| | | | 419/13 |
| 5,944,981 A | | 8/1999 | Sievert |
| 5,950,718 A | | 9/1999 | Sugitani et al. |
| 6,436,202 B1 | | 8/2002 | Benum et al. |
| 6,503,347 B1 | | 1/2003 | Wysiekierski et al. |
| 6,514,563 B1 | | 2/2003 | Kang et al. |
| 6,824,833 B2 | | 11/2004 | Benum et al. |
| 6,852,361 B2 | | 2/2005 | Kang et al. |
| 6,899,966 B2 | | 5/2005 | Benum et al. |
| 7,488,392 B2 | | 2/2009 | Benum et al. |
| 8,421,526 B2 | | 4/2013 | Singnurkar |
| 8,906,822 B2 | | 12/2014 | Petrone et al. |
| 9,421,526 B2 | * | 8/2016 | Petrone ................. B01J 35/0006 |
| 9,499,747 B2 | | 11/2016 | Wang et al. |
| 2002/0192494 A1 | | 12/2002 | Tzatzov et al. |
| 2004/0152586 A1 | | 8/2004 | Ou et al. |
| 2004/0265604 A1 | | 12/2004 | Benum et al. |
| 2013/0337999 A1 | | 12/2013 | Petrone et al. |

FOREIGN PATENT DOCUMENTS

| | | |
|---|---|---|
| CN | 1131583 | 9/1996 |
| CN | 102046846 | 9/2013 |
| CN | 102807887 B | 4/2015 |
| EP | 2390302 B1 | 9/2016 |
| WO | 0194664 | 12/2001 |
| WO | 0222905 | 3/2002 |
| WO | 2009152134 | 12/2009 |
| WO | 2013181606 | 12/2013 |
| WO | 2016023776 A1 | 2/2016 |

OTHER PUBLICATIONS

Bittner et al. Analysis of oxide coatings on steam oxidized incoloy 800, Metallurgical and Materials. Transactions A, 1980, 11(5), 783-790.

Ottewell, S. "New Catalysts Emerge." Chemical Processing, Nov. 2011. Retrieved from Internet at http://www.chemicalprocessing.com/articles/2011/new-catalysts-emerge/?show=all. Retrieved on Feb. 22, 2016.

Wunsch, J.R. "BASF Venture Capital's perspective on Nanotechnology." 4th National Conference of the Nanotechnologies in the Chemical Industry, Milan, Dec. 2010.

International Preliminary Report of Patentability dated Feb. 7, 2019 in International Application No. PCT/IB2017/054583 (6 pages).

International Search Report and Written Opinion dated Dec. 1, 2017, from International Application No. PCT/IB2017/054583, 8 pages.

Extended European Search Report dated Feb. 24, 2020, for EP Application No. 17833686.3, 7 pages.

Keyvani, Majid, "Catalyst-Assisted Manufacture of Olefins from Natural Gas liquids: Prototype Development and Full-Scale Testing Principal Investigators: Other Organizations", Sep. 1, 2015.

* cited by examiner

CATALYTIC COATINGS, METHODS OF MAKING AND USE THEREOF

CROSS-REFERENCE TO RELATED APPLICATIONS

This application is a national stage application filed under 35 U.S.C. § 371 of PCT/IB2017/054583 filed Jul. 27, 2017, which claims the benefit of priority to U.S. Provisional Application No. 62/368,279 filed Jul. 29, 2016, both of which are hereby incorporated herein by reference in their entireties.

BACKGROUND

From a materials perspective, the manufacture of olefins by hydrocarbon steam pyrolysis has not changed very much since originally commercialized, except to progressively operate at higher operating temperatures with overall greater cracking severity. Process containment or furnace coils have evolved in alloy composition and properties over the last 60+ years to sustain the higher temperatures and lower feedstock residence times. This has resulted in an increase in unwanted or negative catalytic reactions at the coil surfaces and other carbon-based fouling mechanisms, as well as the amount of amorphous or gas-phase coke that results from the radical chain reactions of the cracking process; for example, carbon or coke build-up by surface-catalyzed "filamentous" coke-make and accumulation of amorphous coke from the gas-phase reactions. Overall, these fouling mechanisms reduce furnace and plant efficiencies, and significantly increase furnace maintenance costs.

SUMMARY

Described herein are coatings. In some examples, the coatings comprise: a first region having a first thickness, the first region comprising a manganese oxide, a chromium-manganese oxide, or a combination thereof, and can include $CaWO_4$, $Ba_3Y_2WO_9$, or a combination thereof; a second region having a second thickness, the second region comprising $X_6W_6Z$, XWZ, or a combination thereof, wherein X is independently Ni or a mixture of Ni and one or more transition metals and Z is independently Si, C, or a combination thereof; and a rare earth element, a rare earth oxide, or a combination thereof. The transition metal can comprise, for example, Fe, Nb, Cr, Co, Mn, Ti, Mo, V, or a combination thereof. In some examples, the second region comprises Mn in an amount of from 3 wt % to 15 wt % (e.g., from 7 wt % to 15 wt %). In some examples, the second region comprises Si in an amount of from 1 wt % to 10 wt % (e.g., from 3 wt % to 10 wt %, from 5 wt % to 10 wt %). The coatings can, for example, catalyze carbon gasification.

Also described herein are coatings that comprise: a first region having a first thickness, the first region comprising a manganese oxide, a chromium-manganese oxide, or a combination thereof, and can include $CaWO_4$, $Ba_3Y_2WO_9$, or a combination thereof; and a second region having a second thickness, the second region comprising $X_6W_6Z$, XWZ, or a combination thereof, wherein X is independently Ni or a mixture of Ni and one or more transition metals and Z is independently Si, C, or a combination thereof, and wherein the second region comprises Mn in an amount of from 7 wt % to 15 wt % and Si in an amount of from 5 wt % to 10 wt %. The transition metal can comprise, for example, Fe, Nb, Cr, Co, Mn, Ti, Mo, V, or a combination thereof. In some examples, the coatings can further comprise a rare earth element, a rare earth oxide, or a combination thereof. The coatings can, for example, catalyze carbon gasification.

The rare earth element, rare earth oxide, or combination thereof can comprise, for example, Ce, La, Y, Pr, or a combination thereof. In some examples, the rare earth element comprises Y. In some examples, the rare earth oxide comprises $CeO_2$, $La_2O_3$, $Y_2O_3$, $Pr_2O_3$, or a combination thereof. The first region can, for example, comprise the rare earth element, the rare-earth oxide, or a combination thereof in an amount of from 0.1 wt % to 3 wt % (e.g., from 1 wt % to 3 wt %, from 1.5 wt % to 3 wt %, or from 0.3 wt % to 1.5 wt %).

In some examples, the second region comprises Si in an amount of from 6 wt % to 8 wt %. In some examples, the second region comprises Mn in an amount of 9 wt % to 15 wt % (e.g., from 12 wt % to 15 wt %).

The thickness of the first region can, for example, be from 2 microns to 20 microns (e.g., from 4 microns to 15 microns, from 5 microns to 12 microns, from 6 microns to 10 microns, or from 7 microns to 9 microns). The thickness of the second region can be, for example, from 200 microns to 1,200 microns (e.g., from 200 microns to 1,000 microns; from 300 microns to 700 microns; from 200 microns to 500 microns; or from 350 microns to 500 microns).

The manganese oxide can be selected from the group consisting of MnO, $Mn_2O_3$, $Mn_3O_4$, $MnO_2$, and combinations thereof. In some examples, the manganese oxide comprises $Mn_3O_4$.

The chromium-manganese oxide can comprise a spinel chromium-manganese oxide, an inverse spinel chromium-manganese oxide, a non-stoichiometric chromium-manganese oxide, or a combination thereof. In some examples, the chromium-manganese oxide comprises $MnCr_2O_4$.

In some examples, the first region can comprises a surface loading of $CaWO_4$, $Ba_3Y_2WO_9$, or a combination thereof in an amount of from 10% to 90% (e.g., from 10% to 60%, from 10% to 40%, from 15% to 35%, or from 20% to 30%).

In some examples, the second region comprises Ni in an amount of 15-45 wt %, W in an amount of 10-50 wt %, Cr in an amount of 2-8 wt %, Fe in an amount of 1-10 wt %, Mn in an amount of 7-15 wt %, Si in an amount of 5-10 wt %, Nb in an amount of 0-2 wt %, Mo in an amount of 0-2 wt %, Ti in an amount of 0-2 wt %, Zr in amount of 0-2 wt %, and the rare earth element, rare earth oxide, or combination thereof in an amount of 0.1-3 wt % (e.g., 1-3 wt %).

In some examples, the second region comprises Ni in an amount of 15-45 wt %, W in an amount of 10-50 wt %, Cr in an amount of 2-8 wt %, Fe in an amount of 1-10 wt %, Mn in an amount of 7-15 wt %, Si in an amount of 5-10 wt %, Nb in an amount of 0-2 wt %, Mo in an amount of 0-2 wt %, Ti in an amount of 0-2 wt %, Zr in amount of 0-2 wt %, and Ce in an amount of 0.1-3 wt % (e.g., 1-3 wt %).

The second region, in some examples, comprises $X_6W_6Z$ in an amount of 50 wt % or more (e.g., 80 wt % or more), based on the total weight of the $X_6W_6Z$ and XWZ.

Also described herein are substrates, the substrates having a surface, wherein any of the coatings described herein can be provided as a coating on the surface of the substrate. The substrate can, for example, be made from a high temperature alloy (HTA). In some examples, the HTA can comprise a nickel-chromium-based alloy (e.g., an austenitic steel), a nickel-cobalt-based superalloy, or a combination thereof.

Additional advantages of the disclosed compositions and methods will be set forth in part in the description which follows, and in part will be obvious from the description. The advantages of the disclosed compositions will be realized and attained by means of the elements and combinations particularly pointed out in the appended claims. It is to be understood that both the foregoing general description and the following detailed description are exemplary and explanatory only and are not restrictive of the disclosed compositions, as claimed.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURES

The accompanying figures, which are incorporated in and constitute a part of this specification, illustrate several aspects of the disclosure, and together with the description, serve to explain the principles of the disclosure.

DETAILED DESCRIPTION

Figure 1:
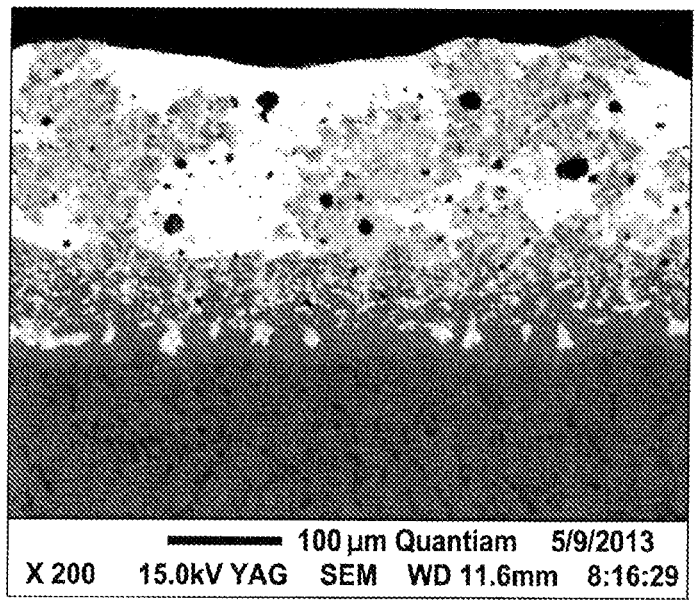
FIG. 1 is a back scattered electron image of a cross-section of a consolidated coating formed with 0.5 wt % $CeO_2$ added during powder mixing.

The compositions and methods described herein may be understood more readily by reference to the following detailed description of specific aspects of the disclosed subject matter and the examples included therein.

Before the present compositions and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

In this specification and in the claims that follow, reference will be made to a number of terms, which shall be defined to have the following meanings.

Throughout the description and claims of this specification the word "comprise" and other forms of the word, such as "comprising" and "comprises," means "including but not limited to," and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the component" includes mixtures of two or more such components, and the like.

"Optional" or "optionally" means that the subsequently described event or circumstance can or cannot occur, and that the description includes instances where the event or circumstance occurs and instances where it does not.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

Olefin production through hydrocarbon steam cracking is highly energy and capital intensive. One detrimental consequence of the cracking process is the formation of coke. Coke deposits in cracking coils, quench exchangers, and other downstream equipment which can result in: loss of heat transfer and thermal efficiency, carburization of coils and components, high maintenance costs and reduced furnace availability, high pressure drop and reduction in furnace throughput, and reduced production yield.

In a conventional uncoated cracking coil, nickel and iron in the bulk tube metal (typically austenitic steel) act as catalysts for coke formation. In early stage coke formation, coke grows as hair-like filaments with an active nickel or iron particle at the tip. In the later stages of growth, the filaments grow laterally into each other and continue to lengthen. The result is a thick porous carbon coating. As this surface process at the steel surface progresses, a second source of coke-make, known as gas-phase coke or amorphous coke, is produced as a by-product of the radical-chain based cracking process and such amorphous coke collects on the filaments growing on the steel surface leading to a complex and dense coke layer at the inner tube wall.

Described herein are coatings and coating methods. In some examples, the coatings and coating methods described herein can reduce or eliminate filamentous coke-make and can catalyze carbon gasification reactions, which can thereby reduce the overall build-up of coke in cracking coils, quench exchangers, and/or other downstream equipment. The coatings described herein can, in some examples, be used to protect pipe and equipment for other, non-olefin production processes in which coke formation is undesirable. In general, stainless steel surfaces are prone to the formation of filamentous (catalytic) carbon or coke and the accumulation of amorphous (or gas-phase) coke, with their relative contribution to the total coke-make being defined by the petrochemical manufacturing process, feedstock, and the operating conditions. Filamentous coke formation is well documented and has been shown to be catalyzed by transition metal surface species, their oxides, and compounds thereof, with iron and nickel-based species being the major catalysts present in stainless steels.

The coatings described herein are deposited on a substrate and have two regions. A first region is the outermost region of the coating with respect to the substrate; this region is exposed to the processing atmosphere. Underlying the first region and immediately adjacent the substrate is a second region.

The first region of the coating can comprise a manganese oxide, a chromium-manganese oxide, or a combination thereof. The first region can provide chemical stability to the coatings, for example, for commercial utility in a petrochemical furnace environment (e.g., within a cracking environment). In some examples, the coating, and particularly the first region, can catalyze carbon gasification.

The manganese oxide can, for example, be selected from the group consisting of $MnO$, $Mn_2O_3$, $Mn_3O_4$, $MnO_2$, and combinations thereof.

The chromium manganese oxide can, for example, have a spinel or an inverse spinel structure. In some examples, the chromium manganese oxide can be non-stoichiometric. In some examples, the chromium manganese oxide can comprise $Mn_aCr_{3-a}O_4$, wherein $0.5 \leq a < 3$. In some examples of $Mn_aCr_{3-a}O_4$, a can be 0.5 or more (e.g., 0.6 or more, 0.7 or more, 0.8 or more, 0.9 or more, 1.0 or more, 1.1 or more, 1.2 or more, 1.3 or more, 1.4 or more, 1.5 or more, 1.6 or more, 1.7 or more, 1.8 or more, 1.9 or more, 2.0 or more, 2.1 or more, 2.2 or more, 2.3 or more, 2.4 or more, 2.5 or more, 2.6 or more, 2.7 or more, or 2.8 or more). In some examples of $Mn_aCr_{3-a}O_4$, a can be less than 3.0 (e.g., 2.9 or less, 2.8 or less, 2.7 or less, 2.6 or less, 2.5 or less, 2.4 or less, 2.3 or less, 2.2 or less, 2.1 or less, 2.0 or less, 1.9 or less, 1.8 or less, 1.7 or less, 1.6 or less, 1.5 or less, 1.4 or less, 1.3 or less, 1.2 or less, 1.1 or less, 1.0 or less, 0.9 or less, 0.8 or less, 0.7 or less, or 0.6 or less). In certain examples, the chromium manganese oxide can comprise $MnCr_2O_4$.

The first region can have a first thickness; the thickness of the first region can be selected, for example, to increase the product life of the coating for compatibility with operating in severe petrochemical furnace environments. In some examples, the thickness of the first region can be 2 micrometers (microns) or more (e.g., 3 microns or more, 4 microns or more, 5 microns or more, 6 microns or more, 7 microns or more, 8 microns or more, 9 microns or more, 10 microns or more, 11 microns or more, 12 microns or more, 13 microns or more, 14 microns or more, 15 microns or more, 16 microns or more, 17 microns or more, or 18 microns or more). In some examples, the thickness of the first region can be 20 microns or less (e.g., 19 microns or less, 18 microns or less, 17 microns or less, 16 microns or less, 15 microns or less, 14 microns or less, 13 microns or less, 12 microns or less, 11 microns or less, 10 microns or less, 9 microns or less, 8 microns or less, 7 microns or less, 6 microns or less, or 5 microns or less). The thickness of the first region can range from any of the minimum values described above to any of the maximum values described above. For example, the thickness of the first region can be from 2 microns to 20 microns (e.g., from 4 microns to 15 microns, from 5 microns to 12 microns, from 6 microns to 10 microns, or from 7 microns to 9 microns).

The first region can further comprise, in some examples, $CaWO_4$, $Ba_3Y_2WO_9$, or a combination thereof. The first region can have a surface and the $CaWO_4$, $Ba_3Y_2WO_9$, or a combination thereof can, for example, be loaded onto the surface of the first region. In some examples, the first region can comprise a surface loading of $CaWO_4$, $Ba_3Y_2WO_9$, or a combination thereof in an amount of 10% or more (e.g., 15% or more, 20% or more, 25% or more, 30% or more, 35% or more, 40% or more, 50% or more, 55% or more, 60% or more, 65% or more, 70% or more, 75% or more, 80% or more, 85% or more, 90% or more, or 95% or more). In some examples, the first region can comprise a surface loading of $CaWO_4$, $Ba_3Y_2WO_9$, or a combination thereof in an amount of less than 100% (e.g., 95% or less, 90% or less, 85% or less, 80% or less, 75% or less, 70% or less, 65% or less, 60% or less, 55% or less, 50% or less, 45% or less, 40% or less, 35% or less, 30% or less, 25% or less, 20% or less, or 15% or less). The surface loading of the $CaWO_4$, $Ba_3Y_2WO_9$, or a combination thereof in the first region can range from any of the minimum values described above to any of the maximum values described above. For example, the first region can have a surface loading of $CaWO_4$, $Ba_3Y_2WO_9$, or a combination thereof in an amount of from 10% to less than 100% (e.g., from 10% to 90%, from 10% to 80%, from 10% to 70%, from 10% to 60%, from 10% to 50%, from 10% to 40%, from 15% to 35%, or from 20% to 30%). The surface loading of the $CaWO_4$, $Ba_3Y_2WO_9$, or a combination thereof is determined using scanning electron microscopy and energy-dispersive X-ray spectroscopy (SEM/EDS).

The second region of the coating can comprise $X_6W_6Z$ (i.e., $X_6W_6Z_1$, which can also be referred to as the "661" phase), wherein X is Ni or a mixture of Ni and one or more transition metals and Z is Si, C, or a combination thereof. The second region can further comprise, for example, XWZ (i.e., $X_1W_1Z_1$, which can also be referred to as the "111" phase), wherein X is Ni or a mixture of Ni and one or more transition metals, and Z is Si, C, or a combination thereof. The transition metal can, for example, comprise Fe, Nb, Cr, Co, Mn, Ti, Mo, V, or a combination thereof. The second region can, in some examples, comprise $X_6W_6Z$ in an amount of 50 wt % or more (e.g., 55 wt % or more, 60 wt % or more, 65 wt % or more, 70 wt % or more, 75 wt % or more, 80 wt % or more, 85 wt % or more, 90 wt % or more, or 95 wt % or more), based on the total weight of the $X_6W_6Z$ and XWZ.

The second region of the coating can, for example, comprise Mn in an amount of 3 wt % or more (e.g., 4 wt % or more, 5 wt % or more, 6 wt % or more, 7 wt % or more, 8 wt % or more, 9 wt % or more, 10 wt % or more, 11 wt % or more, 12 wt % or more, 13 wt % or more, or 14 wt % or more). In some examples, the second region of the coating can comprise Mn in an amount of 15 wt % or less (e.g., 14 wt % or less, 13 wt % or less, 12 wt % or less, 11 wt % or less, 10 wt % or less, 9 wt % or less, 8 wt % or less, 7 wt % or less, 6 wt % or less, or 5 wt % or less). The amount of Mn in the second region can range from any of the minimum values described above to any of the maximum values described above. For example, the second region can comprise Mn in an amount of from 3 wt % to 15 wt % (e.g., from 9 wt % to 15 wt %, from 6 wt % to 9 wt %, form 9 wt % to 12 wt %, from 12 wt % to 15 wt %, from 6 wt % to 15 wt %, or from 7 wt % to 15 wt %).

The second region of the coating can, for example, comprise Si in an amount of 1 wt % or more (e.g., 2 wt % or more, 3 wt % or more, 4 wt % or more, 5 wt % or more, 6 wt % or more, 7 wt % or more, 8 wt % or more, or 9 wt % or more). In some examples, the second region of the coating can comprise Si in an amount of 10 wt % or less (e.g., 9 wt % or less, 8 wt % or less, 7 wt % or less, 6 wt % or less, 5 wt % or less, 4 wt % or less, 3 wt % or less, or 2 wt % or less). The amount of Si in the second region can range from any of the minimum values described above to any of the maximum values described above. For example, the second region can comprise Si in an amount of from 1 wt % to 10 wt % (e.g., from 3 wt % to 6 wt %, from 3 wt % to 10 wt %, from 5 wt % to 10 wt %, from 6 wt % to 10 wt %, or from 6 wt % to 8 wt %).

In some examples, the coatings described herein can comprise a first region having a first thickness, the first region comprising a manganese oxide, a chromium-manganese oxide, or a combination thereof; and a second region having a second thickness, the second region comprising $X_6W_6Z$, XWZ, or a combination thereof, wherein X is independently Ni or a mixture of Ni and one or more transition metals and Z is independently Si, C, or a combination thereof, wherein the second region comprises Mn in an amount of from 7 wt % to 15 wt % and Si in an amount of from 5 wt % to 10 wt %.

The second region can have a second thickness; the thickness of the second region can be selected, for example, to increase the product life of the coating for compatibility with operating in severe petrochemical furnace environments. In some examples, the second region can have a thickness of 200 microns or more (e.g., 250 microns or more; 300 microns or more; 350 microns or more; 400 microns or more; 450 microns or more; 500 microns or more; 550 microns or more; 600 microns or more; 650 microns or more; 700 microns or more; 750 microns or more; 800 microns or more; 850 microns or more; 900 microns or more; 1,000 microns or more; 1,050 microns or more; 1,100 microns or more; or 1,150 microns or more). In some examples, the second region can have a thickness of 1,200 microns or less (e.g., 1,150 microns or less; 1,100 microns or less; 1,050 microns or less; 1,000 microns or less; 950 microns or less; 900 microns or less; 850 microns or less; 800 microns or less; 750 microns or less; 700 microns or less; 650 microns or less; 600 microns or less; 550 microns or less; 500 microns or less; 450 microns or less; 400 microns or less; 350 microns or less; 300 microns or less; or 250 microns or less).

The thickness of the second region can range from any of the minimum values described above to any of the maximum values described above. For example, the second region can have a thickness of from 200 microns to 1,200 microns (e.g., from 200 microns to 1,000 microns; from 200 microns to 800 microns; from 300 microns to 700 microns; from 200 microns to 500 microns; or from 350 microns to 500 microns).

The coatings can further comprise a rare earth element, a rare earth oxide, or a combination thereof. The presence of the rare earth element, rare earth oxide, or combination thereof in the coating (e.g., in the first region and/or the second region), can, for example, improve the thermomechanical robustness of the first region, for example, for commercial utility in severe petrochemical furnace environments.

The rare earth element and/or the rare earth oxide can comprise, for example, Sc, Y, La, Ce, Pr, Nd, Pm, Sm, Eu, Gd, Tb, Dy, Ho, Er, Tm, Yb, Lu, or a combination thereof. In some examples, the rare earth element, rare earth oxide, or combination thereof can comprise Ce, La, Y, Pr, or a combination thereof. For example, the rare earth element can comprise Y metal. In some examples, the rare earth oxide can comprise $CeO_2$, $La_2O_3$, $Y_2O_3$, $Pr_2O_3$, or a combination thereof. In some examples, the rare earth oxide can comprise $CeO_2$, $La_2O_3$, or a combination thereof. In some examples, the rare earth oxide can comprise a mischmetal. In some examples, the mischmetal can comprise 75% $CeO_2$ by weight and 25% $La_2O_3$ by weight.

The rare earth element, rare earth oxide, or a combination thereof can be present in the first region, the second region, or a combination thereof. In some examples, the first region can comprise the rare earth element, the rare-earth oxide, or a combination thereof in an amount of 0.1 wt % or more (e.g., 0.2 wt % or more, 0.3 wt % or more, 0.4 wt % or more, 0.5 wt % or more, 0.6 wt % or more, 0.7 wt % or more, 0.8 wt % or more, 0.9 wt % or more, 1.0 wt % or more, 1.1 wt % or more, 1.2 wt % or more, 1.3 wt % or more, 1.4 wt % or more, 1.5 wt % or more, 1.6 wt % or more, 1.7 wt % or more, 1.8 wt % or more, 1.9 wt % or more, 2.0 wt % or more, 2.1 wt % or more, 2.2 wt % or more, 2.3 wt % or more, 2.4 wt % or more, 2.5 wt % or more, 2.6 wt % or more, 2.7 wt % or more, or 2.8 wt % or more). In some examples, the first region can comprise the rare earth element, the rare-earth oxide, or a combination thereof in an amount of 3 wt % or less (e.g., 2.9 wt % or less, 2.8 wt % or less, 2.7 wt % or less, 2.6 wt % or less, 2.5 wt % or less, 2.4 wt % or less, 2.3 wt % or less, 2.2 wt % or less, 2.1 wt % or less, 2.0 wt % or less, 1.9 wt % or less, 1.8 wt % or less, 1.7 wt % or less, 1.6 wt % or less, 1.5 wt % or less, 1.4 wt % or less, 1.3 wt % or less, 1.2 wt % or less, 1.1 wt % or less, 1.0 wt % or less, 0.9 wt % or less, 0.8 wt % or less, 0.7 wt % or less, 0.6 wt % or less, 0.5 wt % or less, 0.4 wt % or less, or 0.3 wt % or less).

The amount of rare earth element, rare earth oxide, or combination thereof in the first region can range from any of the minimum values described above to any of the maximum values described above. For example, the first region can comprise the rare earth element, the rare-earth oxide, or a combination thereof in an amount of from 0.1 wt % to 3 wt % (e.g., from 0.1 wt % to 1.5 wt %, from 1.5 wt % to 3 wt %, from 0.1 wt % to 1.0 wt %, from 1 wt % to 2 wt %, from 2 wt % to 3 wt %, from 1 wt % to 3 wt %, from 0.8 wt % to 3 wt %, from 0.3 wt % to 1.5 wt %, from 0.5 wt % to 1.4 wt %, or from 0.6 wt % to 0.9 wt % from 2.0 wt % to 2.5 wt %, or from 2.5 wt % to 3.0 wt %).

In some examples, the second region of the coating can comprise Ni in an amount of 15-45 wt % (e.g., 25-45 wt %, or 30-45 wt %), W in an amount of 10-50 wt % (e.g., 25-50 wt %, or 30-50 wt %), Cr in an amount of 2-8 wt % (e.g., 3.8-8 wt %, or 5.2-8 wt %), Fe in an amount of 1-10 wt % (e.g., 3-10 wt %, or 5-10 wt %), Mn in an amount of 3-15 wt % (e.g., 6-15 wt %, or 9-15 wt %), Si in an amount of 1-10 wt % (e.g., 3-10 wt %, or 5-10 wt %), Nb in an amount of 0-2 wt %, Mo in an amount of 0-2 wt %, Ti in an amount of 0-2 wt %, Zr in amount of 0-2 wt % or less, and the rare earth element, rare earth oxide, or combination thereof in an amount of 0.1-3 wt % (e.g., 1-3 wt %).

In some examples, the second region of the coating can comprise Ni in an amount of 15-45 wt % (e.g., 25-45 wt %, or 30-45 wt %), W in an amount of 10-50 wt % (e.g., 25-50 wt %, or 30-50 wt %), Cr in an amount of 2-8 wt % (e.g., 3.8-8 wt %, or 5.2-8 wt %), Fe in an amount of 1-10 wt % (e.g., 3-10 wt %, or 5-10 wt %), Mn in an amount of 3-15 wt % (e.g., 6-15 wt %, or 9-15 wt %), Si in an amount of 1-10 wt % (e.g., 3-10 wt %, or 5-10 wt %), Nb in an amount of 0-2 wt %, Mo in an amount of 0-2 wt %, Ti in an amount of 0-2 wt %, Zr in amount of 0-2 wt % or less, and Ce in an amount of 0.1-3 wt % (e.g., 1-3 wt %).

Also disclosed herein are substrates, said substrates having a surface, wherein any of the coatings described herein are provided as a coating on the surface of the substrates. The substrate can be any material to which the coating will bond. For example, the substrate can be a cracking coil, quench exchanger, or other downstream equipment used for olefin production or steam pyrolysis. In some examples, the substrate can comprise a tube and/or pipe that can be used in petrochemical processes such as cracking of hydrocarbons and in particular the cracking of ethane, propane, butane, naphthas, and gas oil, or mixtures thereof.

The substrate can, for example, be in the form of a reactor or vessel having an interior surface, said interior surface having the coating applied thereto. The substrate can, for example, be in the form of a heat exchanger in which either or both of the internal and/or external surfaces of the heat exchanger have the coating applied thereto. Such heat exchangers can be used to control the enthalpy of a fluid passing in or over the heat exchanger.

Hydrocarbon processing in the manufacture of petrochemicals is carried out in processing equipment that includes tubing, piping, fittings and vessels of broad geometries and alloy compositions, any of which can be used as the substrate. These components are generally made of ferrous-based alloys designed to provide adequate chemical, mechanical and physical properties for process containment, and resistance to a range of materials degradation processes. In commercial applications operating above 500° C., austenitic stainless steels are often used ranging from 300 series alloys through to 35Cr-45Ni—Fe alloys, with the level of nickel and chromium in the alloy generally increasing with operating temperature. Above 800° C., a sub-group of these austenitic steels are used and are collectively known as high-temperature alloys (HTAs) or heat-resistant alloys. These HTA steels range from 25Cr-20Ni—Fe (HK40) through to 35Cr-45Ni—Fe (or higher), plus alloying additives in cast form, and similar compositions in wrought form. The classification and composition of such steels are known to those skilled in the art.

In some examples, the coatings and/or substrates can be used in furnace tubes and/or pipes used for the cracking of alkanes (e.g. ethane, propane, butane, naphtha, and gas oil, or mixtures thereof) to olefins (e.g. ethylene, propylene, butene, etc.). Generally in such an operation a feedstock (e.g. ethane) is fed in a gaseous form to a tube, pipe or coil. The tube or pipe runs through a furnace generally maintained at a temperature from 900° C. to 1150° C. and the outlet gas generally has a temperature from 800° C. to 900° C. As the feedstock passes through the furnace it releases hydrogen (and other byproducts) and becomes unsaturated (e.g. ethylene). The typical operating conditions such as temperature, pressure and flow rates for such processes are well known to those skilled in the art.

The selection of a substrate compatible with the operating environment and also compatible with coating formulation for generating targeted microstructures is considered. In some examples, the substrate can be made from a high temperature alloy (HTA). The HTA can be, in some examples, a nickel-chromium-based alloy (e.g., an austenitic steel), a nickel-cobalt-based superalloy, or a combination thereof. Examples of HTAs include, but are not limited to, HK40, 800-series (e.g., 800, 800H, 800HT), 25Cr-35Ni—Fe, 35Cr-45Ni—Fe, 40Cr-50Ni—Fe, superalloys, and the like, any of which can further include microalloying elements.

In some examples, the substrate can have an elongation of 4% or more (e.g., 5% or more, or 6% or more) after the coating has been provided as a coating on the surface of the substrate.

The coatings described herein can be used, for example, on substrates that comprise metal alloy components susceptible to carbon-based fouling (coking), corrosion and erosion in hydrocarbon processing at elevated temperatures. The coatings can generate and sustain surfaces that can catalytically gasify carbonaceous matter, can be inert to filamentous-coke formation, and can provide a net positive economic impact to hydrocarbon manufacturing processes. Additionally, the coatings can provide protection to the substrate from various forms of materials degradation inclusive of high temperature oxidation, carburization, and erosion. The coatings can be functionally-graded such that they can achieve both the outermost surface catalytic properties required, and a broad range of chemical, physical and thermo-mechanical properties needed to survive the severe operating conditions of hydrocarbon processing, specifically, petrochemicals manufacture that can exceed 800° C.

Commercial applications of such coatings and/or coated substrates include furnace components used to manufacture major petrochemicals such as olefins by hydrocarbon steam pyrolysis in which temperatures may exceed 1100° C. These coatings and surfaces can increase operating efficiency by gasification of carbonaceous deposits, reduce filamentous coke formation, and positively impact the overall pyrolysis process and product stream.

Also disclosed herein are methods of making the coatings and coated substrates described herein.

The methods of making the coatings can comprise forming a mixture of powders, such as a mixture of metal powders, a mixture of metalloid powders, or a combination thereof. The mixture of powders can, for example, comprise Ni; Fe; Mn; Si; W; a rare earth element, a rare earth oxide, or a combination thereof (e.g., $CeO_2$); or a combination thereof. In certain examples, the mixture of powders can comprise a first mixture of Ni in an amount of 60-70 wt %, Fe in an amount of 5-10 wt %, Mn in an amount of 5-15 wt %, and Si in an amount of 10-20 wt %. In certain examples, the mixture of powders can comprise the first mixture in an amount of from 50-55 wt % in further combination with W in an amount of 45-50 wt % and a rare earth element, a rare earth oxide, or a combination thereof (e.g. $CeO_2$) in an amount of 0.1-1.5 wt %. The mixture of powders can be formed, for example, by mixing two or more powders. Mixing can be accomplished by mechanical agitation, for example mechanical stirring, shaking (e.g., using a 3-dimensional shaker-mixer), vortexing, sonication (e.g., bath sonication, probe sonication), grinding, milling (e.g., air-attrition milling (jet milling) or ball milling), and the like. The powders can, for example, be in elemental form. In some examples, the powders can be processed (e.g., screened) to have a size distribution having $d_{50}$ of 10 microns or less (e.g., 9 microns or less, 8 microns or less, 7 microns or less, 6 microns or less, 5 microns or less, 4 microns or less, 3 microns or less, 2 microns or less, or 1 micron or less).

In some examples, the powders and/or the powder mixture can be pre-conditioned to make the powders and/or powder mixture reactive. The individual powders can be pre-conditioned prior to mixing. Alternatively, some or all of the powders can be mixed and then subject to a pre-conditioning treatment (e.g., the powder mixture can be pre-conditioned). For example, the powders and/or powder mixture can be exposed to a reducing agent to remove oxide from the surface of the powders. Reduction of the oxide can be performed by exposing the powders and/or powder mixture to heated hydrogen, or by any other method known in the art. In some examples, all of the powder and/or powder mixture is made reactive. In other examples, only a portion of each of the powders and/or a portion of the powder mixture is made reactive.

The methods can also include, in some examples, exposing the mixture of powders to a first heat treatment. The first heat treatment can at least partially stabilize the powder mixture, e.g. thereby forming a partially stabilized powder mixture. The first heat treatment can be conducted at a first temperature, said first temperature can, for example, be 250° C. or more (e.g., 350° C. or more, or 400° C. or more). The first heat treatment can be conducted for a first amount of time, for example from 1 hour to 6 hours. The amount of time for which the first heat treatment is conducted can vary with temperature; the hotter the temperature of the heat treatment, the less time is used for the heat treatment. The first heat treatment can, for example, be conducted in a vacuum or an inert atmosphere. Examples of inert atmospheres include, but are not limited to, argon, neon, helium, or combinations thereof.

If the coating is to be formed on a substrate, the powder mixture and/or the partially stabilized powder mixture can be applied to the object (e.g., the substrate) to be coated. Application of the powder mixture and/or the partially stabilized powder mixture can be performed by a range of techniques capable of delivering powder-based formulations to the surface of the substrate. Such techniques include, but are not limited to, spray coating and dip coating. Depending on the application process selected, the powder mixture and/or the partially stabilized powder mixture can be in a liquid form, a spray form, a slurry form, or a quasi-solid form, with additions of aqueous and/or organic components known to those versed in the art and appropriate to the compositional formulations noted above. In some examples, after the powder mixture and/or the partially stabilized powder mixture has been applied to the substrate, the substrate with the powder mixture and/or the partially stabilized powder mixture applied thereto is allowed to dry.

Next, a heat treatment is performed on the substrate coated with the powder mixture and/or the partially stabilized powder mixture. The heat treatment consolidates the coating, e.g., thereby forming a consolidated coating. In the consolidation process, the powder mixture interdiffuses into a defined microstructure (e.g., with defined regions). The temperature of consolidation can, for example, range from 900 to 1200° C. (e.g., from 1000° C. to 1200° C., or from 1050° C. to 1150° C.). The time for which the consolidation heat treatment occurs can, for example, range from 1 hour to 6 hours (e.g., from 2 hours to 4 hours, or from 2.5 hours to 3.5 hours). The temperature and/or time of consolidation can be selected based on the base material or steel alloy composition (e.g., the nature of the substrate, if present), coating formulation, and the targeted coating microstructure.

The second heat treatment can, for example, be conducted in a vacuum and/or in an inert atmosphere. Examples of inert atmospheres include, but are not limited to, argon, neon, helium, or combinations thereof. The concentration of reactive gases, such as oxygen and nitrogen, in the atmosphere during the second heat treatment should be kept low. In certain example, a vacuum is first drawn and then 1-2 torr of argon is introduced to the vacuum chamber in which the second heat treatment is performed.

Following heat treatment consolidation, the consolidated coating is prepared for final surface generation. Standard cleaning procedures can be used to achieve the desired level of surface cleanliness and surface finish. An initial hydrogen treatment can, in some examples, be used to reduce surface oxide species and remove carbonaceous contaminants such as organic cutting fluids. Surface generation can be achieved by performing a controlled oxidation on the consolidated coating, to thereby form the coating. In the controlled oxidation, the consolidated coating is heated in the presence of oxygen. Depending on the oxygen concentration, during the controlled oxidation the temperature at which the controlled oxidation is performed, and the time for which the controlled oxidation is performed, different oxide compositions, crystal structures, and morphologies can be produced.

In some examples, the methods further include doping the first region of the coating with $CaWO_4$, $Ba_3Y_2WO_9$, or a combination thereof. Doping with $CaWO_4$ can be performed, for example, by introducing a sol containing, for example, CaO and $WO_3$ during the controlled oxidation. Doping can be performed at elevated temperatures, for example at temperatures below 800° C. In an embodiment, the sols can be introduced into a gas stream during the controlled oxidation. Other methods of doping the first region of the coating with $CaWO_4$, $Ba_3Y_2WO_9$, or a combination thereof can also be used, such as using fine powders.

The rare earth element, rare earth oxide, or combination thereof can be added during various stages of the methods described above. In some examples, the rare earth element, rare earth oxide, or combination thereof can be added as a powder during the formation of the mixture of powders. In some examples, the methods can further comprise adding the rare earth element, rare earth oxide, or combination thereof to the powder mixture and/or the partially stabilized powder mixture before being applied to the substrate.

In some examples, the methods can further comprise applying the rare earth element, rare earth oxide, or combination thereof to the powder mixture and/or the partially stabilized powder mixture after the powder mixture and/or the partially stabilized powder mixture has been applied to the substrate. Application of the rare earth element, rare earth oxide, or combination thereof can be performed, for example, by spray coating, dip coating, or any other coating method. Depending on the application process selected, the rare earth element, rare earth oxide, or combination thereof can be in a liquid form, a spray form, or a quasi-solid form. In some examples, after the rare earth element, rare earth oxide, or combination thereof has been applied to the powder mixture and/or the partially stabilized powder mixture on the substrate, the powder mixture and/or the partially stabilized powder mixture on the substrate with the rare earth element, rare earth oxide, or combination thereof applied thereto is allowed to dry.

In some examples, the methods can further comprise applying the rare earth element, rare earth oxide, or combination thereof to the consolidated coating. Application of the rare earth element, rare earth oxide, or combination thereof can be performed, for example, by spray coating, dip coating, or any other coating method. Depending on the application process selected, the rare earth element, rare earth oxide, or combination thereof can be in a liquid form, a spray form, or a quasi-solid form. In some examples, after the rare earth element, rare earth oxide, or combination thereof has been applied to the consolidated coating, the consolidated coating with the rare earth element, rare earth oxide, or combination thereof applied thereto is allowed to dry.

A number of embodiments of the invention have been described. Nevertheless, it will be understood that various modifications may be made without departing from the spirit and scope of the invention. Accordingly, other embodiments are within the scope of the following claims.

The examples below are intended to further illustrate certain aspects of the systems and methods described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. There are numerous variations and combinations of measurement conditions, e.g., component concentrations, temperatures, pressures and other measurement ranges and conditions that can be used to optimize the described process.

Example 1

The effect of five rare earth element and/or rare earth oxide species, ($CeO_2$, $La_2O_3$, $Pr_2O_3$, $Y_2O_3$, and Y metal) at two loadings (0.05 and 0.5 wt %) on the coating robustness were evaluated by adding the rare earth element and/or rare earth oxide into the coating during powder processing (e.g., during formation of the mixture of powders).

Figure 2:
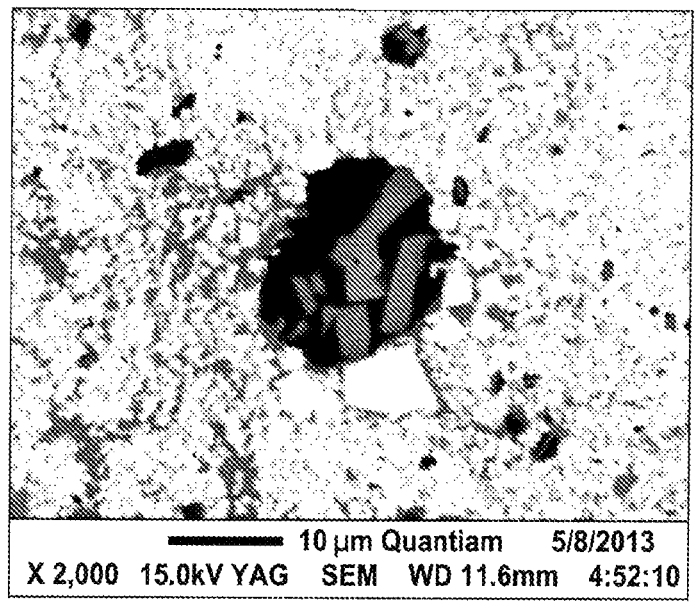
FIG. 2 is a higher magnification back scattered electron image of the cross-section of a consolidated coating formed with 0.5 wt % $CeO_2$ added during powder mixing shown in FIG. 1.

After the consolidation heat treatment, rare earth element and/or rare earth oxide species were associated with other oxygen containing phases present within the consolidated coating. Back scattered electron images of the consolidated coating formed with 0.5 wt % $CeO_2$ added are shown in FIG. 1 and FIG. 2.

Figure 3:
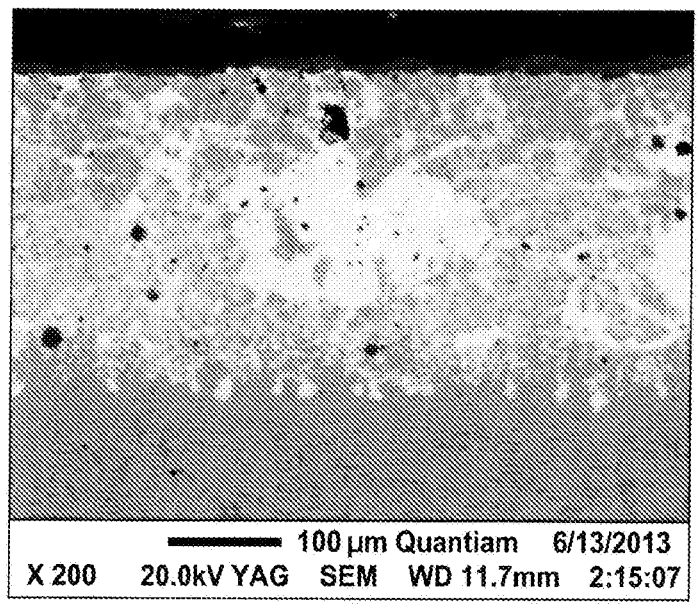
FIG. 3 is a back scattered electron image of a cross-section of a coating formed with 0.5 wt % $CeO_2$ added during powder mixing.
Figure 4:
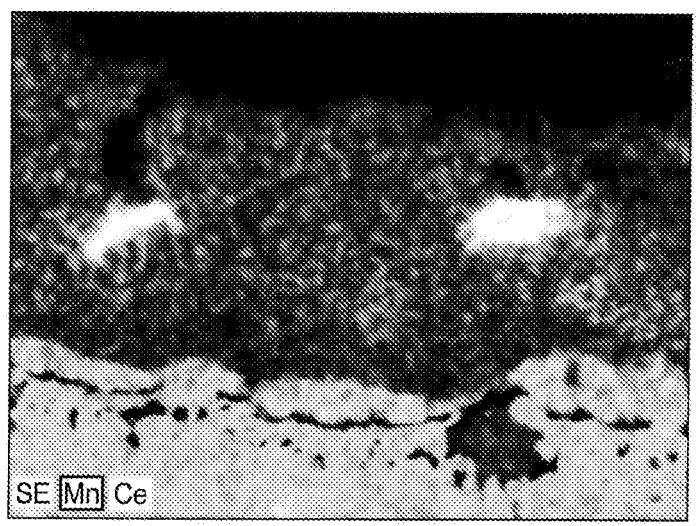
FIG. 4 is an energy-dispersive x-ray spectroscopy map of a cross-section of a coating formed with 0.5 wt % $CeO_2$ added during powder mixing.

After the surface generation, a portion of the rare earth element and/or rare earth oxide species migrated to the first region while a portion remained within the second region. A back scattered electron image of the coating formed with 0.5 wt % $CeO_2$ added is shown in FIG. 3 and an energy-dispersive x-ray spectroscopy map of the coating formed with 0.5 wt % $CeO_2$ added is shown in FIG. 4.

Figure 5:
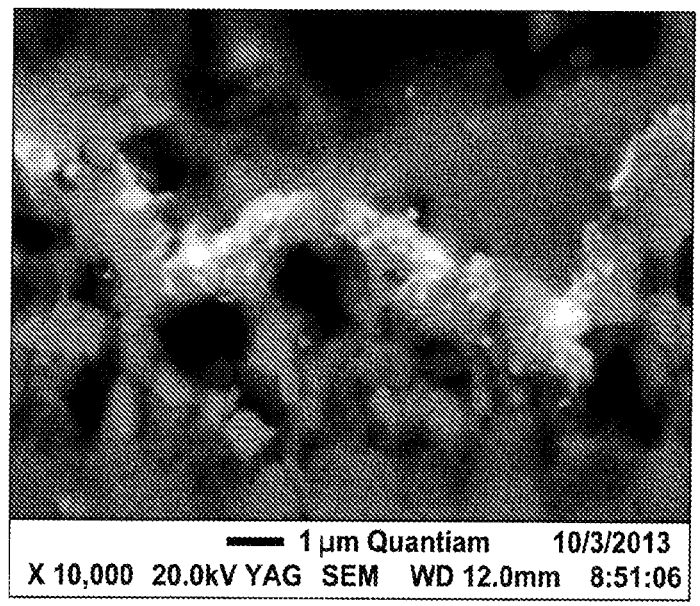
FIG. 5 is a back scattered electron image of a cross-section of a coating formed with $CeO_2$ added onto the consolidated coating.
Figure 6:
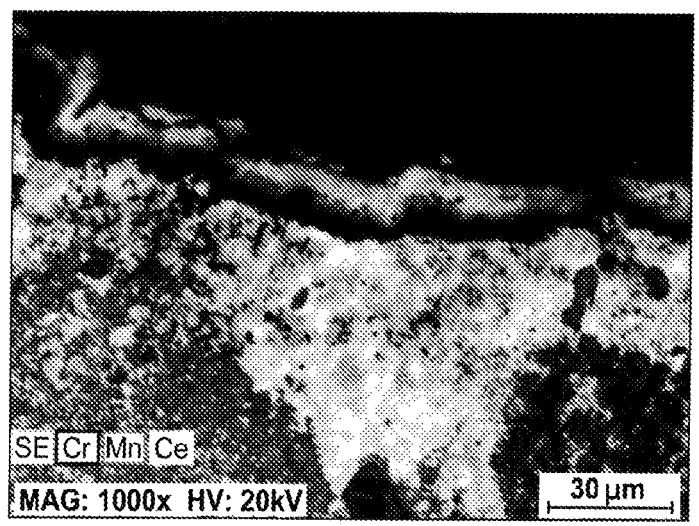
FIG. 6 is an energy-dispersive x-ray spectroscopy map of a cross-section of a coating formed with $CeO_2$ added onto the consolidated coating.
Figure 7:
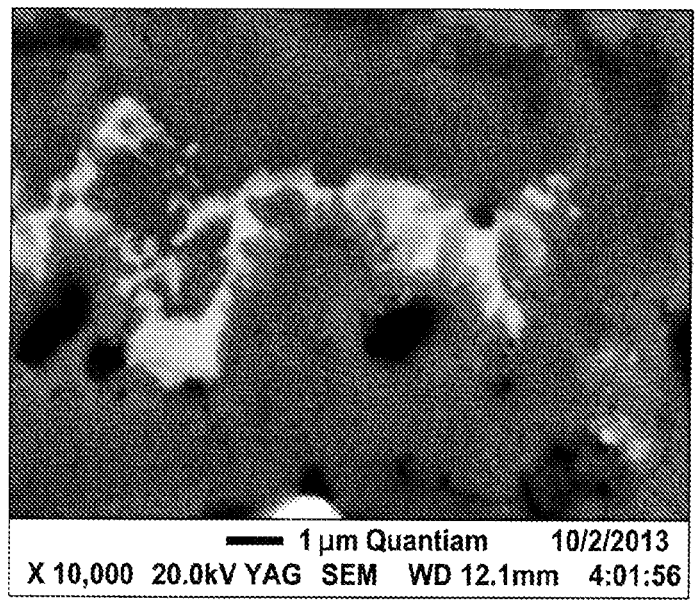
FIG. 7 is a back scattered electron image of a cross-section of a coating formed with $La_2O_3$ added onto the consolidated coating.
Figure 8:
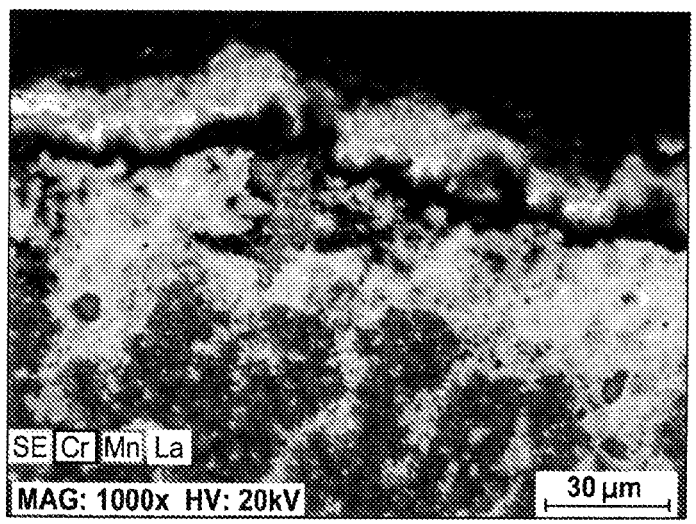
FIG. 8 is an energy-dispersive x-ray spectroscopy map of a cross-section of a coating formed with $La_2O_3$ added onto the consolidated coating.

The effect of rare earth element and/or rare earth oxide species on the coating robustness were also evaluated by adding the rare earth element and/or rare earth oxide to the surface of the consolidated coating. For example, Ce and La acetate were dissolved in water and deposited on a consolidated coating surface. The acetate species were then heat treated to form the desired oxide, after which the coating underwent surface generation. A back scattered electron image of the coating formed with $CeO_2$ added is shown in FIG. 5 and an energy-dispersive x-ray spectroscopy map of the coating formed with $CeO_2$ added is shown in FIG. 6. A back scattered electron image of the coating formed with $La_2O_3$ added is shown in FIG. 7 and an energy-dispersive x-ray spectroscopy map of the coating formed with $La_2O_3$ added is shown in FIG. 8.

Figure 9:
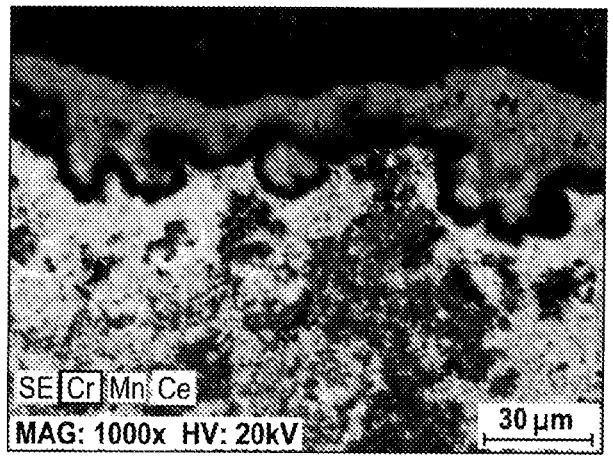
FIG. 9 is an energy-dispersive x-ray spectroscopy map of a cross-section of a coating formed with $CeO_2$.
Figure 10:
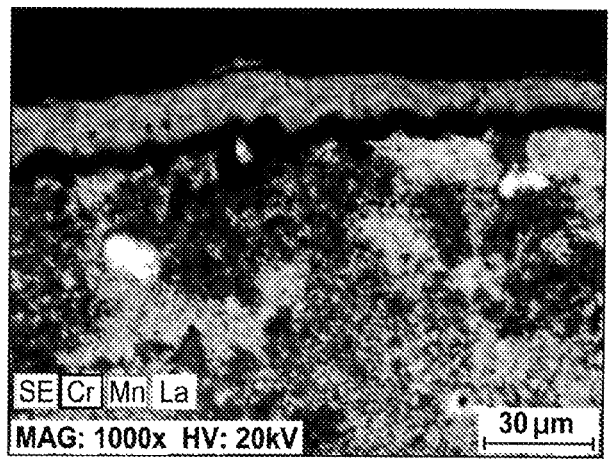
FIG. 10 is an energy-dispersive x-ray spectroscopy map of a cross-section of a coating formed with $La_2O_3$.
Figure 11:
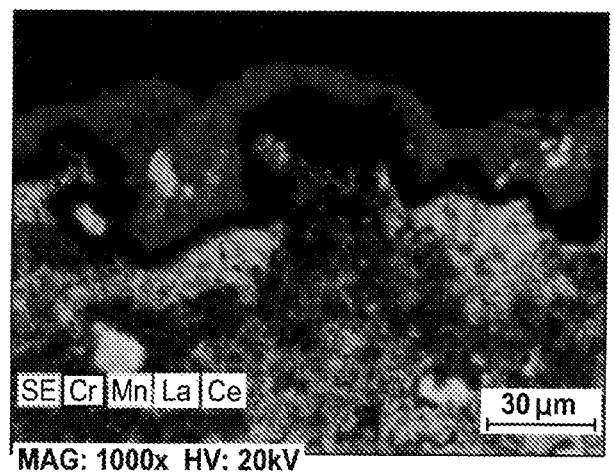
FIG. 11 is an energy-dispersive x-ray spectroscopy map of a cross-section of a coating formed with the Mischmetal (75 wt % $CeO_2$, 25 wt % $La_2O_3$).

The effect of rare earth element and/or rare earth oxide species on the first region's robustness were also evaluated by adding the rare earth element and/or rare earth oxide during the formation of the coating. For example, three rare earth element and/or rare earth oxide species—$CeO_2$, $La_2O_3$, and a mischmetal combination (75 wt % $CeO_2$, 25 wt % $La_2O_3$), at two loadings (1.5 and 3.0 wt %) were evaluated. After the consolidation heat treatment, rare earth element and/or rare earth oxide species were associated with other oxygen containing phases present within the consolidated coating. After the surface generation, a portion of the rare earth element and/or rare earth oxide species migrated to the first region and formed "pegs" at the interface between the first region and the second region, while a portion remained within the second region. Energy-dispersive x-ray spectroscopy maps of the coatings formed with $CeO_2$, $La_2O_3$, and the mischmetal are shown in FIG. 9, FIG. 10, and FIG. 11, respectively.

Figure 12:
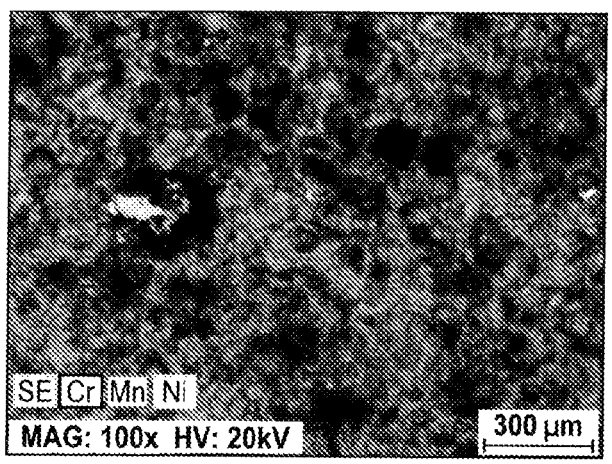
FIG. 12 is an energy-dispersive x-ray spectroscopy map of the surface of the reference coating sample after three water quenches.
Figure 13:
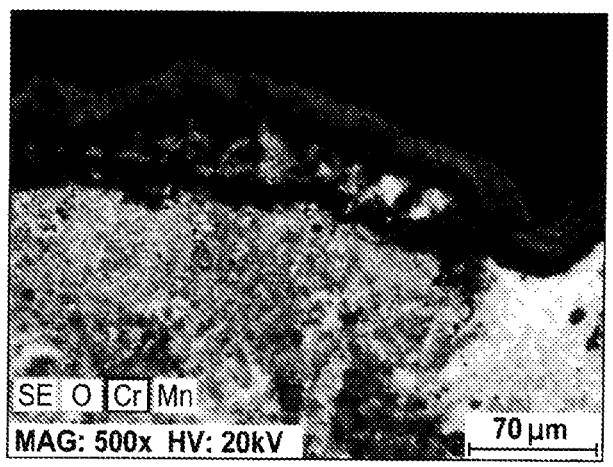
FIG. 13 is an energy-dispersive x-ray spectroscopy map of a cross-section of the reference coating sample after three water quenches.
Figure 14:
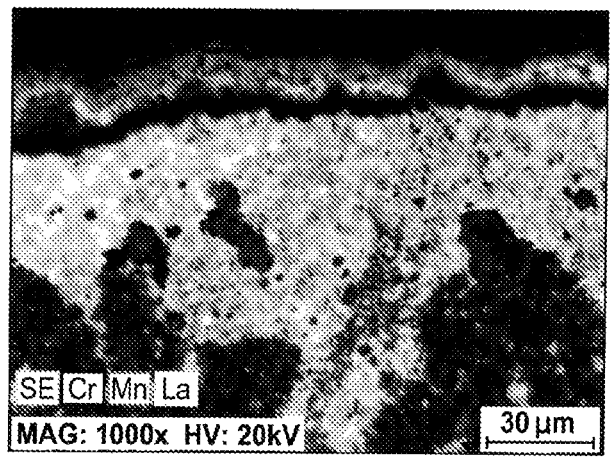
FIG. 14 is an energy-dispersive x-ray spectroscopy map of a cross-section of a coating sample, where the rare earth element and/or rare earth oxide was added to the consolidated coating, after three water quenches.
Figure 15:
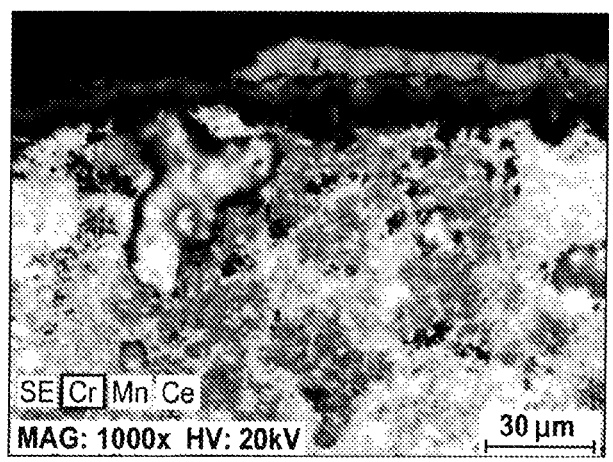
FIG. 15 is an energy-dispersive x-ray spectroscopy map of a cross-section of the coating sample, where the rare earth element and/or rare earth oxide was added, after three water quenches.

The thermo-mechanical robustness of the various samples was examined by heating the samples to 1000° C. and then water quenching the samples. Reference samples (e.g., coatings with no rare earth element and/or rare earth oxide) after three water quenches exhibited delamination of the first region, which in some cases completely removed areas of the first region exposing the second region (FIG. 12 and FIG. 13). The samples in which the rare earth element and/or rare earth oxide was added to the consolidated coating had few areas of delamination and cracking, and were mostly intact after three water quenches (FIG. 14). The samples in which the rare earth element and/or rare earth oxide were added had areas of partial delamination to certain areas of the first region, but no delamination to the second region (FIG. 15).

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The methods of the appended claims are not limited in scope by the specific methods described herein, which are intended as illustrations of a few aspects of the claims and any methods that are functionally equivalent are intended to fall within the scope of the claims. Various modifications of the methods in addition to those shown and described herein are intended to fall within the scope of the appended claims. Further, while only certain representative method steps disclosed herein are specifically described, other combinations of the method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

What is claimed is:
1. A coating comprising:
a first region having a first thickness, the first region comprising a manganese oxide, a chromium-manganese oxide, or a combination thereof, and $CaWO_4$, $Ba_3Y_2WO_9$, or a combination thereof;
a second region having a second thickness, the second region comprising $X_6W_6Z$, XWZ, or a combination thereof, wherein X is independently Ni or a mixture of Ni and one or more transition metals and Z is independently Si, C, or a combination thereof; and a rare earth element, a rare earth oxide, or a combination thereof.

2. The coating of claim 1, wherein the second region comprises Mn in an amount of from 3 wt % to 15 wt %, based on the total weight of the second region.

3. The coating of claim 1, wherein the second region comprises Si in an amount of from 1 wt % to 10 wt %, based on the total weight of the second region.

4. The coating of claim 1, wherein the rare earth element, rare earth oxide, or combination thereof comprises Ce, La, Y, Pr, or a combination thereof.

5. The coating of claim 4, wherein the rare earth element comprises Y.

6. The coating of claim 4, wherein the rare earth oxide comprises $CeO_2$, $La_2O_3$, $Y_2O_3$, $Pr_2O_3$, or a combination thereof.

7. The coating of claim 1, wherein the first region comprises the rare earth element, the rare-earth oxide, or a combination thereof in an amount of from 0.1 wt % to 3 wt %, based on the total weight of the first region.

8. The coating of claim 7, wherein the second region comprises the rare earth element, the rare earth oxide, or a combination thereof in an amount of from 1.5 wt % to 3 wt %, based on the total weight of the second region.

9. The coating of claim 1, wherein the thickness of the first region is from 2 microns to 20 microns.

10. The coating of claim 1, wherein the second region has a thickness of from 200 microns to 1,200 microns.

11. The coating of claim 1, wherein the manganese oxide is selected from the group consisting of MnO, $Mn_2O_3$, $Mn_3O_4$, $MnO_2$, and combinations thereof.

12. The coating of claim 1, wherein the chromium-manganese oxide comprises a spinel chromium-manganese oxide, an inverse spinel chromium-manganese oxide, a non-stoichiometric chromium-manganese oxide, or a combination thereof.

13. The coating of claim 1, wherein the chromium-manganese oxide comprises $MnCr_2O_4$.

14. The coating of claim 1, wherein the first region comprises a surface loading of $CaWO_4$, $Ba_3Y_2WO_9$, or a combination thereof in an amount of from 10% to 90%, based on the surface area of the first region.

15. The coating of claim 1, wherein the second region comprises Ni in an amount of 15-45 wt %, W in an amount of 10-50 wt %, Cr in an amount of 2-8 wt %, Fe in an amount of 1-10 wt %, Mn in an amount of 7-15 wt %, Si in an amount of 5-10 wt %, Nb in an amount of 0-2 wt %, Mo in an amount of 0-2 wt %, Ti in an amount of 0-2 wt %, Zr in amount of 0-2 wt %, and the rare earth element, the rare earth oxide, or combination thereof in an amount of 0.1-3 wt %, based on the total weight of the second region.

16. The coating of claim 1, wherein the second region comprises Ni in an amount of 15-45 wt %, W in an amount of 10-50 wt %, Cr in an amount of 2-8 wt %, Fe in an amount of 1-10 wt %, Mn in an amount of 7-15 wt %, Si in an amount of 5-10 wt %, Nb in an amount of 0-2 wt %, Mo in an amount of 0-2 wt %, Ti in an amount of 0-2 wt %, Zr in amount of 0-2 wt %, and Ce in an amount of 0.1-3 wt %, based on the total weight of the second region.

17. The coating of claim 1, wherein the second region comprises $X_6W_6Z$ in an amount of 50 wt % or more, based on the total weight of the $X_6W_6Z$ and XWZ.

18. The coating of claim 1, wherein the coating catalyzes carbon gasification.

19. A substrate having a surface, wherein the coating of claim 1 is provided as a coating on the surface of the substrate, wherein the substrate is made from a high temperature alloy (HTA).

20. A coating comprising:
    a first region having a first thickness, the first region comprising a manganese oxide, a chromium-manganese oxide, or a combination thereof, and $CaWO_4$, $Ba_3Y_2WO_9$, or a combination thereof; and
    a second region having a second thickness, the second region comprising $X_6W_6Z$, XWZ, or a combination thereof, wherein X is independently Ni or a mixture of Ni and one or more transition metals and Z is independently Si, C, or a combination thereof,
    wherein the second region comprises Mn in an amount of from 7 wt % to 15 wt % and Si in an amount of from 5 wt % to 10 wt %, based on the total weight of the second region.

* * * * *